United States Patent
Ting et al.

(10) Patent No.: US 7,413,758 B2
(45) Date of Patent: *Aug. 19, 2008

(54) PREPARATION OF LIGHT STABLE HOP PRODUCTS

(75) Inventors: Patrick L. Ting, Brookfield, WI (US); Henry Goldstein, Tucson, AZ (US); Aki A. Murakami, Mequon, WI (US); Michael VanSanford, Wales, WI (US); Jay R. Refling, Greenfield, WI (US); John R. Seabrooks, Richfield, WI (US); David S. Ryder, Mequon, WI (US)

(73) Assignee: MillerCoors LLC, Wilmington, DE (US)

( * ) Notice: Subject to any disclaimer, the term of this patent is extended or adjusted under 35 U.S.C. 154(b) by 840 days.

This patent is subject to a terminal disclaimer.

(21) Appl. No.: 10/328,055

(22) Filed: Dec. 23, 2002

(65) Prior Publication Data
US 2003/0185934 A1    Oct. 2, 2003

Related U.S. Application Data

(63) Continuation-in-part of application No. 10/106,603, filed on Mar. 26, 2002, now Pat. No. 7,258,887.

(51) Int. Cl.
*C12C 3/00* (2006.01)
(52) U.S. Cl. ............ 426/600; 426/429; 426/489
(58) Field of Classification Search ........ 426/429, 426/431, 478, 489, 600
See application file for complete search history.

(56) References Cited

U.S. PATENT DOCUMENTS

| | | | |
|---|---|---|---|
| 3,952,061 A | 4/1976 | Koller et al. | |
| 4,002,683 A | 1/1977 | Todd, Jr. | |
| 4,490,405 A * | 12/1984 | von Horst et al. | 426/600 |
| 4,666,731 A * | 5/1987 | Todd, Jr. | 426/600 |
| 4,765,993 A | 8/1988 | Owades | |
| 4,767,640 A | 8/1988 | Goldstein et al. | |
| 4,778,691 A | 10/1988 | Todd, Jr. | |
| 4,844,939 A | 7/1989 | Todd, Jr. | |
| 4,956,195 A | 9/1990 | Todd, Jr. et al. | |
| 5,013,571 A | 5/1991 | Hay | |
| 5,013,572 A | 5/1991 | Hay | |
| 5,073,396 A | 12/1991 | Todd, Jr. | |
| 5,296,637 A | 3/1994 | Stegink et al. | |
| 5,523,489 A | 6/1996 | Ting et al. | |
| 5,767,319 A | 6/1998 | Ting et al. | |
| 5,783,235 A | 7/1998 | Ting et al. | |
| 5,804,234 A * | 9/1998 | Suh et al. | 426/69 |
| 5,874,633 A * | 2/1999 | Ting et al. | 568/347 |
| 5,917,093 A | 6/1999 | Ting et al. | |
| 5,972,411 A | 10/1999 | Goldstein et al. | |
| 6,020,019 A | 2/2000 | Ting et al. | |
| 2003/0185933 A1* | 10/2003 | Ting et al. | 426/11 |

FOREIGN PATENT DOCUMENTS

| | | |
|---|---|---|
| DE | 635624 | 4/1937 |
| DE | 10139479 A1 | 2/2003 |
| SU | 1601112 A1 | 10/1990 |
| WO | WO 97/46116 A1 | 12/1997 |

OTHER PUBLICATIONS

Jackson, Michael. Beer Hunter. Be On Your Guard for Fine French Beers. Feb. 1, 1992. http://www.beerhunter.com/documents/19133-000128.html.*
PCT Search Report for PCT/US03/08637, date unknown.
PCT Search Report for PCT/US03/08637.

* cited by examiner

*Primary Examiner*—Arthur L Corbin
(74) *Attorney, Agent, or Firm*—Quarles & Brady, LLP

(57) ABSTRACT

Disclosed are methods for the production of light stable hop products, useful for the brewing of beer or ale to be stored in clear or green glass containers, which beer or ale will not develop objectionable flavor as a result of exposure to light. Light stable hop products are prepared by double extraction of liquid/supercritical $CO_2$ extracted hop solids with ethanol to remove alpha/iso-alpha-acids. Such alpha/iso-alpha-acids may be further removed from the ethanol extraction filtrate obtained in the double extraction process by subjecting such filtrate to an ion exchange medium, or precipitation by a metal ion, heavy metal ion, or alkali metal ion, or hydrogenation to provide an alpha/iso-alpha-acids free filtrate which may be added to the light stable double extracted hop solid residues obtained in the initial double extraction process.

24 Claims, No Drawings

PREPARATION OF LIGHT STABLE HOP PRODUCTS

CROSS REFERENCES TO RELATED APPLICATIONS

This application is a continuation-in-part of U.S. application Ser. No. 10/106,603 filed Mar. 26, 2002, now U.S. Pat. No. 7,258,887

STATEMENT REGARDING FEDERALLY SPONSORED RESEARCH

Not applicable.

BACKGROUND OF THE INVENTION

1. Field of the Invention

The present invention is directed to the preparation of light stable hop products, containing little or no alpha/iso-alpha-acids, that can be used for providing hop flavor and character for beer products which may be packaged in flint, clear, or green bottles. This invention produces a hop product which imparts not only hop flavor and mouthfeel indistinguishable from original whole hops, but also provides light stability and flavor variations in malt beverages. Such treated hop solids can contribute hop flavor and mouthfeel to beer with low bitterness.

2. Description of the Related Art

Hops, in the form of either the ground dried plant or pellets, have been used in brewing to give malt beverages such as beer or ale their essential characteristics of aroma, flavor, mouthfeel, and bitterness, as well as contributing foam and antimicrobial activity to the brew. Hops comprise soft resins, hard resins, waxes, lipids, and carbohydrates. The soft resins include alpha-acids, beta-acids and hop oils. The hops are usually added to the boiling wort in the brewing kettle, and the wort is then fermented by yeast to produce the finished product. During boiling, alpha-acids in the hops are converted into iso-alpha-acids, which contribute the bitterness and foam in the finished product. Such iso-alpha-acids are, however, susceptible to a photochemical reaction which produces "skunk", an undesirable sulfur flavor characteristic resulting from the presence of 3-methyl-2-butene-1-thiol. This reaction is known to occur when the finished product including iso-alpha-acids is packaged in flint (clear white), clear or green bottles and exposed to light.

Hops may be separated into hop solids and hop soft resins, i.e. hop extract containing the extracted alpha-acids, beta-acids, and hop oils, by employing liquid/supercritical $CO_2$ or less-polar organic solvent extractions. The hop extract contributes most of the bitterness flavor in beer. Beer brewed solely with the hop extract does not impart a complete hops flavor spectrum to the beer due to the absence of the water-soluble components, which apparently remain in the hop solids. The bitterness flavor can also be added as pure forms after fermentation or in the finished products. To integrate the full spectrum of hop flavor would thus require the addition of hop solids to the brew, but the hop solids have been found to contain trace amounts of alpha/iso-alpha-acids, which, due to lack of light stability, contribute to skunkiness in beer. Therefore, to obtain the full flavor of the hops while avoiding skunkiness in beer, light stable hop products that can be used to produce a beer would be of value.

It is known that there are a number of U.S. patents relative to this matter, such as Ting et al. U.S. Pat. No. 5,783,235, which teaches the preparation of a hop flavored, less bitter fermented beverage by addition of the solid hop residue remaining after $CO_2$ extraction (as the sole hopping agent) to the wort, boiling the mixture, removing the solids from the fermented mixture, and fermenting the remainder to obtain the final product. While this method does provide a brew having less bitterness but a comparable hop flavor to a brew prepared using whole hops, it does not fully address the issue of iso-alpha-acids present in the solid hop residue. In one embodiment of the Ting et al. '235 method, the solid hop residue and a hop character fraction (HCF, i.e., the residue of a hop extract remaining after removal of all alpha-acids and all beta-acids from the hop extract obtained from the $CO_2$ extraction), are pelletized and added to the wort prior to or during boiling. After the mixture is boiled and fermented with yeast to convert the hop components and the wort, the solids are then separated to obtain the liquid product. Since the solid hop residue is present in the brewing kettle, iso-alpha-acids are present in the final brew, potentially leading to an undesirable skunk flavor.

Ting et al., in U.S. Pat. No. 5,767,319, teach conversion of iso-alpha-acids to light stable tetrahydroiso-alpha-acids, which are known bittering agents. While an improvement over previous conversion methods, the patent necessitates additional treatment steps to obtain specified metal salts of the iso-alpha-acids, dissolving the metal salts in an aqueous alcohol medium, and reducing the iso-alpha-acids by hydrogenation under specific conditions to form the tetrahydroiso-alpha-acids, which are then recovered from the reaction medium. Such a method clearly adds complexity to the desired goal of providing a light stable form of a hop product.

In addition, Ting et al. teach, in U.S. Pat. No. 6,020,019, a method for the hydrogenation of hop soft resins, wherein carbon dioxide is used as a reaction solvent, in liquid or supercritical fluid form, for the conversion of iso-alpha-acids or beta-acids to tetrahydroiso-alpha-acids (tetrahydroisohumulones), preferably using an acidic lower alcohol to act as a promoter for the beta-acids. As previously indicated, tetrahydroiso-alpha-acids are known light-stable FDA-approved bittering agents which may be used to add hop flavoring to beer. In this patent, it was noted that the tetrahydroiso-alpha-acids were previously generally not made from the alpha-acids for economical reasons. The hydrogenation method of this patent permits the use of alpha-acids as a source of tetrahydroiso-alpha-acid for use in brewing.

Additional patents to Ting et al. include U.S. Pat. Nos. 5,523,489, 5,874,633, and 5,917,093. In these patents, methods for the preparation and/or purification of tetrahydroiso-alpha-acids (tetrahydroisohumulones) are discussed. In U.S. Pat. No. 5,523,489, tetrahydroisohumulones are prepared from isohumulones by hydrogenation in ethanol. In U.S. Pat. No. 5,917,093, alpha-acids and beta-acids present in the hop oil fraction of $CO_2$ hop extracts are purified by mixing with an absorbent to remove catalyst poisons, thereby reducing the amount of catalyst necessary for hydrogenation to tetrahydroiso-alpha-acids and tetrahydrodesoxy-alpha-acids. In U.S. Pat. No. 5,874,633, patentees teach a method of hydrogenating and formulating a starting solution of iso-alpha-acids to obtain concentrated solutions of tetrahydroiso-alpha-acids.

In U.S. Pat. No. 5,972,411, Goldstein et al. teach the isolation and characterization of a group of odorless and non-volatile glycosides from extracted hops (hop solids which have previously been extracted with liquid/supercritical $CO_2$ or less-polar solvents.) These glycosides are water soluble and consist of a group of aromatic compounds conjugated to mono-, di- and tri-saccharides. These glycosides are responsible for the formation of kettle hop flavor. Through both chemical and biological transformations, an essence and flavorant can be prepared for addition to an unhopped beer. These kettle hop flavor essences and flavorants provide economy, consistency, flexibility, quality and convenience to the brewing process because only one unhopped wort is required to brew a stock of unhopped beer, which can then be dosed with the desired amount of kettle hop flavor essence and flavorant.

In U.S. Pat. Nos. 5,013,571 and 5,013,572, Hay teaches methods for converting alpha acids to hop bittering flavors by exposing the alpha acids to an environment capable of isomerizing and reducing the alpha acids to form either tetrahydroiso-alpha-acids or hexahydroiso-alpha acids, and then steam stripping odor forming impurities from such to produce purified light stable hop bittering compounds.

In addition to the above, U.S. Pat. No. 4,002,683, of Todd, Jr., teaches a process for isomerizing alpha acids to iso-alpha-acids by contact with an aqueous solution of a metal ion to form materials suitable for use as bittering additives, wherein a water-immiscible organic solvent in which the alpha acid is soluble is employed. Todd, Jr., also teaches, in U.S. Pat. Nos. 4,666,731 and 4,844,939, the separation of the constituents of $CO_2$ Hop Extracts employing aqueous alkali, followed by conversion of the separated alpha acid fraction into an iso-alpha acid or isohumulone fraction useful in the bittering of beer. Moreover, Todd, Jr. et al. teach, in U.S. Pat. Nos. 4,778,691 and 4,956,195, the removal of odor-forming impurities from hop flavors by extracting into water at a pH above 5, and separating the aqueous phase containing the impurities from the purified hop flavors, to recover a flavoring agent selected from unreduced and reduced alpha acids and iso-alpha-acids which is essentially odor-causing-impurity free. And, in U.S. Pat. No. 5,073,396, Todd, Jr. teaches the use of a non-acidic hop flavor fraction for production of beer, wherein the hop flavor fraction is made from $CO_2$ hop extract to provide an extract essentially devoid of alpha and beta acids, by fractionation of the hop extract with an alkaline solution within controlled pH ranges. In U.S. Pat. No. 5,296,637, Stegink et al. teach production of odor-free tetrahydroisohumulates from alpha acids via the tetrahydrohumulates and subsequent isomerization.

Thus, there are a number of processes for the preparation, separation, purification, and use of hop bittering flavors for beer. However, a method for the production of light stable hop products containing little or no alpha/iso-alpha-acids, which also impart hop aroma and flavor to the brewing of beer equivalent to or comparable to the aroma and flavor attained from the use of conventional whole hops or hop pellets, has not previously been provided.

SUMMARY OF THE INVENTION

The present invention provides means for providing light stable hop products which impart hop aroma and flavor to beer when used in preparing beer, without the potential for light sensitivity in the beer resulting in skunkiness. Several techniques have been employed to prepare light stable hop products that can be used to prepare light stable beers. Beers prepared using these light stable hop products were evaluated by sensory testing for light stability and acceptable hop flavor attributes.

In a first aspect, the present invention is a method for the preparation of a light stable hop product. In the method, hop solids are mixed with a first alcohol solvent to form a mixture of the hop solids and the first alcohol solvent, the mixture of the hop solids and the first alcohol solvent is separated into treated hop solids and a first filtrate including alpha/iso-alpha acids, the treated hop solids are mixed with a second alcohol solvent to form a mixture of the treated hop solids and the second alcohol solvent, and the mixture of the treated hop solids and the second alcohol solvent is separated into hop solids residues and a second filtrate including alpha/iso-alpha acids, wherein a light stable hop product comprising the hop solids residues is formed. The exhaustive extraction (double extraction, or DX) of hop solids yields hop solids residues and filtrates containing most of any trace alpha/iso-alpha-acids.

In a second aspect of the present invention, the first filtrate and/or the second filtrate may then be subjected to further processing. In one version of the second aspect of the invention, the first filtrate and/or the second filtrate are applied to an ion exchange removal of the alpha/iso-alpha-acids in the first filtrate and/or the second filtrate from the double extraction, followed by return of the effluent from the ion exchange to the hop solids residues of the double extraction, and followed by concentration of this mixture to obtain a more flavorful light stable hop product. In another version of the second aspect of the invention, the first filtrate and/or the second filtrate are subjected to a metal ion precipitation treatment removal of the alpha/iso-alpha-acids in the first filtrate and/or the second filtrate from the double extraction, followed by return of the filtrate of the precipitation treatment to the hop solids residues of the double extraction, and followed by concentration of this mixture to obtain a light stable hop product. In yet another version of the second aspect of the invention, the first filtrate and/or the second filtrate are subjected to hydrogenation of the alpha/iso-alpha-acids in the first filtrate and/or the second filtrate from the double extraction, followed by return of the filtrate of the hydrogenation to the hop solids residues of the double extraction, and followed by concentration of this mixture to obtain a light stable hop product.

When the light stable hop products of these techniques were used in the preparation of brewed beer, the resulting brews were confirmed to be light stable, and the hop products employed made a contribution to kettle hop flavor attributes of the beer. Still further, it was found that the light stable hop products could be reconstituted with: (i) a hop oil fraction (HOF), that is, a solvent (e.g., $CO_2$) hop extract in which the alpha acids are removed and a portion of the beta acids are removed leaving, among other things, hop oils and beta-acids, (ii) a beta-acid rich fraction, that is, a solvent (e.g., $CO_2$) hop extract in which the alpha acids are removed leaving, among other things, hop oils and beta-acids, and/or (iii) light stable bittering agents (e.g., hydrogenated iso-alpha-acids) to yield a further flavor improvement without causing light instability in brewed product.

It is thus an advantage of the present invention to provide an inexpensive method for the preparation of light stable hop products, which are useful in providing hop flavor and mouthfeel for brewed product to be packaged in clear, flint or green bottles. Such brewed product is found to be less subject to skunk flavor resulting from exposure to light over time.

DETAILED DESCRIPTION OF THE INVENTION

The present invention provides a method for the preparation of light stable hop products which are useful in providing hop flavor and mouthfeel for brewed product to be packaged in clear, flint or green bottles. The method includes the steps of mixing hop solids with a first alcohol solvent to form a mixture of the hop solids and the first alcohol solvent, separating the mixture of the hop solids and the first alcohol solvent into treated hop solids and a first filtrate including alpha/iso-alpha acids, mixing the treated hop solids with a second alcohol solvent to form a mixture of the treated hop solids and the second alcohol solvent, and separating the mixture of the treated hop solids and the second alcohol solvent into hop solids residues and a second filtrate including alpha/iso-alpha acids, wherein a light stable hop product comprising the hop solids residues is formed.

Preferably, the hop solids are obtained by extracting whole hops or hop pellets with carbon dioxide. However, the term "hop solids" as used herein means the solid hop residue obtained by extracting whole hops or hop pellets with any solvent such as hexane, carbon dioxide (liquid or supercritical), alcohol (e.g., ethanol), water, or an alcohol/water mixture, or the solid hop residue recovered after boiling whole hops or hop pellets in a brewing kettle.

The hop solids residues formed in the method may be concentrated using techniques such as evaporation. The hop solids residues or concentrated hop solids residues formed in the method may be mixed with an additive selected from hop oil fractions, beta-acid rich fractions, light stable bittering agents and mixtures of any of these additives.

The first alcohol solvent and the second alcohol solvent used in the method are preferably selected from the group consisting of ethanol and aqueous ethanol solutions. The first alcohol solvent and the second alcohol solvent may be the same or different depending on the final light stable hop product sought. In one version of the invention, the first alcohol solvent and the second alcohol solvent are selected from aqueous ethanol solutions having an ethanol concentration of 5% to 95%. In another version of the invention, the first alcohol solvent and the second alcohol solvent are selected from aqueous ethanol solutions having an ethanol concentration of greater than 90%. In still another version of the invention, the first alcohol solvent and the second alcohol solvent are selected from aqueous ethanol solutions having an ethanol concentration of 95% or greater.

The invention is not limited to the treatment hop solids with a first alcohol solvent to form once treated hop solids and then the treatment of the once treated hop solids with a second alcohol solvent. The hop solids may be extracted any number of times using the same or different alcohol solvents. For example, the hop solids may be treated with an alcohol solvent three, four, five or even more times depending on the hop product sought.

The first filtrate and the second filtrate (and any other filtrates) produced in the method can then be subjected to further processing. In one version of the invention, at least one of the first filtrate and the second filtrate (and any other filtrates) is contacted with an ion exchange resin to remove alpha/iso-alpha-acids from the filtrate. An effluent is collected after contacting the filtrate or filtrates with the ion exchange resin. Preferably, the effluent is essentially free of alpha/iso-alpha-acids. The effluent is then mixed with the hop solids residues produced by the method such that a light stable hop product including the hop solids residues and the effluent is formed. This light stable hop product may be concentrated (e.g., by evaporation) to produce a concentrated mixture of the hop solids residues and the effluent. The concentrated or unconcentrated mixture may be mixed with an additive selected from the group consisting of hop oil fractions, beta-acid rich fractions, light stable bittering agents and mixtures thereof. In an example embodiment, the ion exchange resin is in chloride, hydroxide, or acetate ion form such that dissociated alpha/iso-alpha-acid ions exchange with these anions ($Cl^-$, $OH^-$, and acetate ion) on the resins.

In another version of the invention, at least one of the first filtrate and the second filtrate (and any other filtrates) is mixed with a metal ion that complexes with alpha/iso-alpha acids to form metal ion-alpha/iso-alpha acids complexes. The metal ion-alpha/iso-alpha acids complexes are then separated from the mixture to form another filtrate. This filtrate is then mixed with the hop solids residues produced by the method such that a light stable hop product including the hop solids residues and this filtrate is formed. This light stable hop product may be concentrated (e.g., by evaporation) to produce a concentrated mixture of the hop solids residues and this filtrate. The concentrated or unconcentrated mixture may be mixed with an additive selected from the group consisting of hop oil fractions, beta-acid rich fractions, light stable bittering agents and mixtures thereof. In an example embodiment, the metal ion that complexes with alpha/iso-alpha acids is formed from a compound selected from the group consisting of calcium carbonate, calcium hydroxide, magnesium hydroxide, magnesium carbonate, magnesium acetate, zinc sulfate, zinc acetate, and mixtures thereof.

In still another version of the invention, at least one of the first filtrate and the second filtrate (and any other filtrates) is subjected to hydrogenation to reduce the alpha/iso-alpha acids in the filtrate or filtrates. Such hydrogenated alpha/iso-alpha acids are known to be light stable. Any of the filtrate(s) including hydrogenated alpha/iso-alpha acids are then mixed with the hop solids residues produced by the method such that a light stable hop product including the hop solids residues and the filtrate(s) is formed. This light stable hop product may be concentrated (e.g., by evaporation) to produce a concentrated mixture of the hop solids residues and the filtrate(s). The concentrated or unconcentrated mixture may be mixed with an additive selected from the group consisting of hop oil fractions, beta-acid rich fractions, light stable bittering agents and mixtures thereof. In an example embodiment, the hydrogenation is carried out using a palladium and/or platinum catalyst, and using hydrogen at a pressure in the range of 5-100 psig.

The light stable hop product produced by the method of the invention, in concentrated or unconcentrated form, and including or not including the additives described above, may be used in known methods for preparing a fermented malt beverage. For example, the light stable hop product may be added a wort, prior to or during boiling, and the wort may fermented to produce a fermented malt beverage.

EXAMPLES

The following Examples have been presented in order to further illustrate the invention and are not intended to limit the invention in any way.

Example 1

A thermal decomposition of hop solids in the presence of hot air was unsuccessful, and most residual amounts of alpha-acids were converted into iso-alpha-acids, resulting in a light unstable product. Direct isomerization and reduction of trace amounts of alpha-acids to light stable rho-iso-alpha-acids (or dihydro iso-alpha-acids) in an aqueous hop solid slurry was attempted, employing a caustic sodium borohydride solution ($NaBH_4$). Results were inconsistent, and high performance liquid chromatography (HPLC) analysis indicated that the reduction in alpha-acid content was ineffective due to interference of hop solid materials.

Example 2

Since it is known that trace amounts of alpha/iso-alpha-acids (about 0.1-0.5 weight percent) seem to bind very tightly within the hop cellulose matrix, thus making a direct chemical reaction or reduction difficult, it was decided to attempt the reduction or elimination of alpha/iso-alpha-acids in hop solids by extraction in a homogenous solution system. Low molecular weight alcohols, such as methanol or ethanol, are capable, with efficient mixing, of extracting sufficient amounts of alpha/iso-alpha-acids from hop solids. Due to the cost and potential toxicity of methanol, ethanol has been utilized. In addition to being safe for consumption, 95% ethanol is less soluble for the water-soluble compounds and very soluble for the alpha/iso-alpha-acids. An analytical scale extraction condition was established by comparing the extraction efficiency of acidic 95% ethanol, 95% ethanol, acidic 70% ethanol, and 70% ethanol, using Galena hop solids.

Hop solids double extraction experiments were undertaken. To 200 grams of ground hop solids (the solid residue remaining after $CO_2$ extraction of either Cascade hops or Galena hops) was added 600 milliliters of 95% ethanol. The mixture was then agitated, with a magnetic stir bar, for one hour, followed by vacuum filtration through a Whatman #4 filter paper. The filtrate was retained. The extraction was repeated with another 600 milliliters of 95% ethanol, and the mixture was again vacuum filtered through a Whatman #4 filter paper. The residues on the funnel were washed with an additional 100 milliliters of 95% ethanol. Both filtrates from the two extractions were combined, and the residues were collected. Results are shown in Table 1.

TABLE 1

Extraction Efficiency Analyzed by HPLC

| Extraction Solution | Density of Extract (g/ml) | alpha/Iso-alpha-acid in Extract (%) |
|---|---|---|
| 95% ethanol, Acid | 0.81 | 80 |
| 95% ethanol | 0.99 | 67 |
| 70% ethanol, Acid | 1.04 | 90 |
| 70% ethanol | 1.02 | 80 |

Although the acidic ethanol solutions are demonstrably more effective than neutral solutions, it is possible that the acid may damage the flavor elements of hop solids, or interfere with subsequent treatments. It is also noted that higher water composition solvents co-extract more water soluble compounds. For instance, a dark green color solution (with density of 0.99 g/ml) was obtained using 95% ethanol, while a yellow-brownish color solution (with a density of 1.02 g/ml) was obtained using 70% ethanol. In other words, a total mass of greater than 25% by weight was obtained as compared to 6% when the water composition was increased to 30% (70% ethanol/water) from 5% (95% ethanol) extraction of hop solids. The best results for the reduction and minimization of alpha/iso-alpha-acids appeared to occur in a less complicated 95% ethanol extract.

Therefore, hop solids were extracted using 95% ethanol until most of the alpha/iso-alpha-acids were removed, and subjected to the subsequent treatments. This usually required two consecutive extractions, and the hop solid residues after such a double extraction using 95% ethanol still retain most of the potential water-soluble flavor precursors. This double extracted hop solid residue was then adopted as a basic light stable hop product, and further treatment of the double extracted hop solids liquid filtrate from the double extraction to recover minor amounts of flavor precursors was considered.

Example 3

Further treatment of the double extracted hop solids liquid filtrate was then undertaken. The treatment sought should selectively minimize alpha/iso-alpha-acids, but should also be mild and inert to the flavor precursors. Hydrogenation, sodium borohydride reduction, caustic treatment, ion exchange, alkali metal and metal precipitation were considered for the elimination of alpha/iso-alpha-acids, or for conversion of alpha/iso-alpha-acids into light stable forms (such as tetrahydroiso-alpha-acids). Sodium borohydride reduction of iso-alpha-acids to rho-iso-alpha-acids was possible, but the subsequent removal of undesirable boron compounds added extra steps and expense, and was therefore considered inefficient. However, both ion exchange, alkali metal or metal ion precipitation and hydrogenation showed promising results. The thus treated aqueous ethanol solutions were recombined with the residues and the aqueous ethanol in the mixture was then removed via evaporation to form a reconstituted light stable hop product. The three successful methods are demonstrated hereinafter.

Example 4

An ion-exchange treatment of the double extracted hop solids filtrate was undertaken. A basic ion exchange resin has been used in the past to separate alpha/iso-alpha-acids from methanolic, ethanolic, and hexane extract of hops. Such methods have been used to chromatographically purify alpha-acids, beta-acids, and iso-alpha-acids from hops or hop extract, in which various organic solvents and buffering solutions were used. We departed from this conventional methodology to retain the alpha/iso-alpha-acids on the resins by varying the affinity of the effluent and allowed an elution of alpha/iso-alpha-acids-free effluent. Recombining the alpha/iso-alpha-acids-free effluent and the double extracted hop solid residues afforded a slurry. Evaporation of the aqueous ethanol and drying of the slurry afforded a less distinguishable hop product than the original hop solids, but containing no light unstable alpha/iso-alpha-acids.

Two types of ion exchange resins, BIO-RAD™ AG 1X4 and 3X4, available from Bio-Rad Laboratories of Richmond, Calif., USA were used. Due to pKa differences, the dissociated alpha/iso-alpha-acid ions exchange with these anions ($Cl^-$, $OH^-$, and acetate ion) on the resins. The double extracted hop solids filtrate was diluted with water (either neutral or pH 8) to increase affinity between alpha/iso-alpha-acids and resins. Ion exchange may be performed on either a column or batch basis. For convenience, a batch basis was used in our experimentation. As a result, the residual alpha/iso-alpha-acids were significantly reduced, as shown in Table 2, items 3, 4, 5, 6, 11, and 12.

Two BIO-RAD™ anion exchange resins (AG 1X4, and 3X4, 400 mesh, chloride form) were pre-rinsed with distilled water. The double extracted hop solids filtrate was diluted with a 1:1 ratio of either distilled water or a pH 8 buffer solution, and then added to the ion exchange resins at an amount of 5% of the total mixture. The mixture was allowed to mix for one hour, then filtered through a Whatman #4 filter paper. This filtrate was then mixed with the double extracted hop solids residues. The hop solids residues and the extracted flavor precursors present in the filtrate were simultaneously and homogeneously mixed while the aqueous ethanol was evaporated off by a vacuum rotary evaporator. The resultant light stable hop product was then dried for final usage.

Example 5

An alkali metal or metal ion precipitation treatment of the double extracted hop solids filtrate was also undertaken. Hop alpha-acids and iso-alpha-acids often show a characteristic of complexing with alkali metal ions, divalent ions, and transitional metal ions such as magnesium, calcium, lead, ferric, zinc, etc. The tri-keto group on the alpha-acid molecule has the functionality of chelating with various metal ions. Some of the complexes thus formed are less soluble in water and alcohol. Accordingly, in order to select desirable and effective alkali metal or metal ions which comply with FDA regulations, and to still meet brewing requirements, a number of inorganic salts such as calcium carbonate, calcium hydroxide, magnesium hydroxide, magnesium acetate, zinc sulfate, and zinc acetate were selected.

To 1200 milliliters of filtrate from the double extraction, an equal amount of distilled water was added to reduce the solubility of subsequent forming complexes of alpha/iso-alpha-acids. From 1 to 5 grams of the alkali metal or metal salts, $Ca(OH)_2$, $Ca(OAc)_2$, $CuCl$, $CUSO_4$, $ZnSO_4$, and $Zn(OAc)_2$, respectively, were added to the diluted filtrate, and mixed for one hour at room temperature. The amounts of alpha/iso-alpha-acid were monitored by HPLC, until no further reduction was observed. The precipitate was removed by filtration through a Whatman #4 filter paper, and the filtrate was then added back to the solid residues of the double extraction in a 5 liter round bottom flask. The thus formed mixture was rotary evaporated (under 31 torr at 40-50° C.) to remove ethanol and water. Lyophilizing removed the residual moisture and afforded dried solids for subsequent usage.

Example 6

A hydrogenation of the double extracted hop solids filtrate was also undertaken. The residual alpha/iso-alpha acids in the double extracted hop solids filtrate can be hydrogenated to light stable form as tetrahydroalpha-iso-alpha acids. The residual alpha/iso-alpha acids in the double extracted hop solids filtrate were subjected to hydrogenation using noble-metals as the catalysts. After filtrating off the catalysts, a light stable ethanol solution still containing flavor precursors was obtained. Recombining the ethanol solution and the double extracted hop solid residues afforded a slurry. Evaporation off of the ethanol in the mixture produced a light stable hop product.

To 400 milliliters of double extracted hop solids filtrate was added 2 grams of Pd/C catalyst in an autoclave. The mixture was hydrogenated under 30 psig and 50° C. for 1 hour. The catalyst was removed by filtration and the filtrate was then combined with the double extracted hop solid residues in a 5 liter round bottom flask. The mixture was rotary evaporated under 27 torr at 30-40° C. until the solids were dried.

Example 7

A number of the above light stable hop products were thus prepared and analyzed by HPLC (as shown in Table 2).

TABLE 2

Data of Light Stable Hop Products Added in Brews

| # | LS-Hops Type | Treatment | Addition Rate (ppm) | % Residual alpha/iso-alpha-acids |
|---|---|---|---|---|
| 1 | Galena Hop Solids | None | 2000 | 0.110 |
| 2 | Cascade Hop Solids | None | 2000 | 0.080 |
| 3 | 1A-Galena | 1X4-pH 8 | 1592 | 0.010 |
| 4 | 1B-Cascade | 1X4-pH 8 | 1434 | 0.014 |
| 5 | 3A-Galena | 1X4-neutral | 1630 | 0.040 |
| 6 | 3B-Cascade | 1X4-neutral | 984 | 0.003 |
| 7 | 4A-Galena - | $CuSO_4$ | 1612 | 0.037 |
| 8 | 4B-Cascade | $CuSO_4$ | 1288 | 0.014 |
| 9 | 5A-Galena | $Cu(OAc)_2$ | 862 | 0.019 |
| 10 | 5B-Cascade | $Cu(OAc)_2$ | 660 | 0.010 |
| 11 | 6A-Galena | 3X4-neutral | 1216 | 0.015 |
| 12 | 6B-Cascade | 3X4-neutral | 1338 | 0.036 |
| 13 | 7A-Galena | $Ca(OH)_2$ | 846 | 0.012 |
| 14 | 7B-Cascade | $Ca(OAc)_2$ | 1468 | 0.017 |
| 15 | 8A-Galena | CuCl | 1570 | 0.042 |
| 16 | 8B-Cascade | CuCl | 1194 | 0.010 |
| 17 | 9A-Galena | $ZnSO_4$ | 860 | 0.013 |
| 18 | 9B-Cascade | $ZnSO_4$ | 1476 | 0.021 |
| 19 | 10A-Galena | $Zn(OAc)_2$ | 1288 | 0.023 |
| 20 | 10B-Cascade | $Zn(OAc)_2$ | 1760 | 0.029 |
| 21 | 11A-Galena | $NaBH_4$ | 1538 | 0.110 |
| 22 | 11B-Cascade | $NaBH_4$ | 1846 | 0.085 |
| 23 | 12A-Galena | Double X | 1920 | 0.048 |
| 24 | 12B-Cascade | Double X | 1748 | 0.016 |
| 25 | 13A-Galena | Double X + HOF | 192 | 0.048 |
| 26 | 13B-Cascade | Double X + HOF | 175 | 0.016 |

Despite the estimation and prediction of light stability, actual light stability must be confirmed by sensory observation. Possible light stable hop products made in accordance with each of the four techniques discussed above, and other treated light stable hop product samples, were submitted for pilot brews, as follows.

The double extracted hop solids residues of Example 2 (Double X, Examples 23 and 24) employing 95% ethanol extraction, were brewed at 1920 and 1748 ppm, respectively, as Pilot Brews 8679 and 8670.

To evaluate the effect of the Hop Oil Fraction (HOF) and compensate for the loss of aroma and flavor components resulting from double extraction, 1 gram of HOF was added to 8 grams of the double extracted hop solids residues of Example 2 (Examples 25 and 26). These were brewed at 192 and 175 ppm levels, as Pilot Brews 8685 and 8686.

Ion exchange resin treated samples (Examples 3, 4, 5, 6 and 11) were brewed as Pilot Brews 8664, 8666, 8665, 8667, and 8673. Sample 12 did not brew due to containing a higher alpha/iso-alpha-acids content.

Additional Pilot Brews, numbered 8671, 8672, 8674, 8675, 8676, 8677, 8683, 8681, and 8682 were hopped with various alkali metal ion precipitated light stable (LS) Hop Products corresponding to Examples 8, 10, 13, 15, 16, 20, 14, 18, and 19, respectively.

In addition to the above, two sodium borohydride reduction treated hop solids (Examples 21 and 22) were brewed as Pilot Brews 8678 and 8684. Three control Pilot Brews, Numbers 8661, 8662, and 8663, were unhopped (8661) and hopped with 2000 ppm of Galena hop solids (8662) and Cascade hop solids (8663), respectively. Analytical data may be found in Tables 3 and 4, hereinafter.

Samples of the Pilot Brews, all bottled in 12 oz clear bottles, then packaged in six-pack paper carriers having a height of 5¼ inches, were exposed to 25 foot-candles of fluorescent light for 20 days. A total of 23 products were thus evaluated. Testing was conducted on each exposed sample, and compared to a corresponding unexposed sample. All such testing involved subjectively rating the samples on sulfur character and skunky character. Mean scores are based upon a 24-point linear scale, where 1 is weak, and 24 is strong. The results are set forth in Table 4.

Pilot brews were prepared and characterized in round table sensory evaluation, based upon promising results in light stability testing. The purpose of such testing was to obtain a descriptive profile of each unexposed light stable hop product candidate. The Cascade based light stable hop product candidates seemed to have stronger, fruity/estery notes than the Galena based light stable hop product candidates. Panelists also indicated preferences for pilot brews 8680, 8686, 8676, 8683, 8667, 8672, and 8673. Of these, only the last was based upon a Galena based light stable hop product. These evaluations are shown in Table 4.

A general good correlation between sensory scores (skunkiness) and analytical iso-alpha-acid content demonstrated that the limited iso-alpha-acids present in the Pilot Brews prepared from low iso-alpha-acid content light stable hop product were less subject to skunkiness, and were more acceptable. Analysis indicated that light stable hop products preferably have iso-alpha-acid contents of less than 0.2-0.3 ppm.

TABLE 3

Summary of Light Stability and Skunkiness

| # | Light Stable Hop Product | Brew # | Iso-α-acids % (ppm) | Stability Prediction | Sensory Score Exposed/None | Skunkiness |
|---|---|---|---|---|---|---|
| 0 | Unhopped | 8661 | None | Yes | 3.4/2.9 | none |
| 1 | Galena Jop Solids | 8662 | 0.11 (2.20) | No | 17.0/2.9 | very strong |
| 2 | Cascade Hop Solids | 8663 | 0.080 (1.60) | No | 14.5/2.9 | very strong |
| 3 | 1A-1X4 pH 8 | 8664 | 0.010 (0.02) | Yes | 10/3.0 | strong |
| 4 | 1B-1X4 pH 8 | 8666 | 0.014 (0.20) | Yes | 4.9/3.0 | trace |
| 5 | 3A-1X4 neutral | 8665 | 0.046 (0.65) | Marginal | 15.8/2.9 | very strong |
| 6 | 3B-1X4 neutral | 8667 | 0.003 (0.03) | Yes | 4.8/3/1 | trace |
| 7 | 4A-CuSO$_4$ |  | 0.037 (0.60) | Marginal |  |  |
| 8 | 4B-CuSO$_4$ | 8671 | 0.014 (0.18) | Yes | — | Discarded |
| 9 | 5A-Cu(OAc)$_2$ |  | 0.019 (0.16) | Marginal |  |  |
| 10 | 5B-Cu(OAc)$_2$ | 8672 | 0.010 (0.07) | Yes | 2.9/2.6 | none |
| 11 | 6A-3X4 neutral | 8673 | 0.015 (0.18) | Yes | 4.4/2.5 | trace |
| 12 | 6B-3X4 neutral |  | 0.036 (0.48) | No |  |  |
| 13 | 7A-Ca(OH)$_2$ | 8674 | 0.012 (0.10) | Yes | 3.8/2.6 | none |
| 14 | 7B-Ca(OH)$_2$ | 8683 | 0.017 (0.25) | Yes | 4.0/3.7 | none |
| 15 | 8A-CuCl | 8675 | 0.042 (0.66) | No | 4.1/3.2 | none |
| 16 | 8B-CuCl | 8676 | 0.010 (0.12) | Yes | 2.7/3.0 | none |
| 17 | 9A-ZnSO$_4$ |  | 0.013 (0.11) | Yes |  |  |
| 18 | 9B-ZnSO$_4$ | 8681 | 0.021 (0.31) | Yes | 4.3/3.2 | trace |
| 19 | 10A-Zn(OAc)$_2$ | 8682 | 0.023 (0.30) | Marginal | 2.9/2.7 | none |
| 20 | 10B-Zn(OAc)$_2$ | 8677 | 0.029 (0.51) | Marginal | 6.7/2.7 | slight |
| 21 | 11A-SWS | 8678 | 0.110 (1.69) | No | 8.9/2.6 | moderate |
| 22 | 11B-SWS | 8684 | 0.085 (1.57) | No | 10.3/2.8 | strong |
| 23 | 12A-DX | 8679 | 0.017 (0.32) | No | 6.1/2.6 | slight |
| 24 | 12B-DX | 8680 | 0.016 (0.28) | Yes | 2.7/2.3 | none |
| 25 | 13A-DX + HCF | 8685 | 0.048 (0.09) | Yes | 3.6/2.8 | trace |
| 26 | 13B-DX + HCF | 8686 | 0.016 (0.03) | Yes | 3.0/2.7 | none |

TABLE 4

Sensory Round Table Evaluation

| LS-Hops | P.B. | Round Table Evaluation |
|---|---|---|
| #4-1X4 pH 8 | 8666 | Slight fruity/estery; low aroma strength; low to moderate; Sulfur; slight hop aroma; slightly malty; water/thin |
| #6-1X4 neutral | 8667 | Low to moderate fruity; hoppy aroma; hoppy taste |
| #10-Cu(OA)$_2$ | 8672 | Fruity/estery/banana; slight hop aroma; thin slight lingering after taste; slight metallic; slight sulfur |
| #11-3X4 neutral | 8673 | Slight fruity; slight hoppy aroma; hoppy flavor; slight lingering aftertaste; malty |
| #13-Ca(OH)$_2$ | 8674 | Low aroma and fruity; low to moderate hop aroma; slight hoppy taste; slightly malty |
| #14-Ca(OAc)$_2$ | 8683 | Fruity/estery; hoppy taste; hoppy aroma; slight citrus aroma; slight lingering aftertaste; slight mouthcoat |
| #15-CuCl | 8675 | Slight fruity; hoppy aroma; slight malty; lingering aftertaste |
| #16-CuCl | 8676 | Low to moderate fruity; hoppy aroma; hoppy taste; slight metallic; slight astringent |
| #18-ZnSO$_4$ | 8681 | Low to moderate fruity/estery; hoppy aroma; clove solvent aroma; slight astringent |
| #19-Zn(OAc)$_2$ | 8682 | Low to moderate fruity; clove solvent aroma; malty; hoppy taste; sulfur |
| #23-DX | 8679 | Slight fruity; low malt; harsh; lingering aftertaste |
| #24-DX | 8680 | Low to moderate fruity/estery; low to moderate hop aroma; moderate hop flavor; sulfur; low aftertaste |
| #25-DX + HOF | 8685 | Hoppy aroma; hoppy taste; lingering bitter aftertaste |
| #26-DX + HOF | 8686 | Fruity/estery; low aroma strength; fruity, floral, citrus taste; slight lingering aftertaste |

Thus, there have been provided light stable hop products which impart hop aroma and flavor to beer when used in preparing beer, without the potential for light sensitivity in the beer resulting in skunkiness. Although the present invention has been described in considerable detail with reference to certain embodiments, one skilled in the art will appreciate that the present invention can be practiced by other than the described embodiments, which have been presented for purposes of illustration and not of limitation. For example, alternative forms of hop solids, other than the Galena and Cascade hop solids utilized herein, may be used. Therefore, the scope of the appended claims should not be limited to the description of the embodiments contained herein.

INDUSTRIAL APPLICABILITY

The methods taught herein are useful in the preparation of brewed beverages, such as beer and ale, and specifically permit the brewing of beers and ale which may be stored in uncolored or non-light filtering containers with little or no danger of development of objectionable skunkiness.

We claim:

1. A method for the preparation of a light stable hop product, the method comprising:
    mixing hop solids with a first alcohol solvent to form a mixture of the hop solids and the first alcohol solvent, wherein the hop solids are solid residue obtained by extracting whole hops or hop pellets with carbon dioxide;
    separating the mixture of the hop solids and the first alcohol solvent into treated hop solids and a first filtrate including alpha/iso-alpha acids;
    mixing the treated hop solids with a second alcohol solvent to form a mixture of the treated hop solids and the second alcohol solvent; and
    separating the mixture of the treated hop solids and the second alcohol solvent into hop solids residues and a second filtrate including alpha/iso-alpha acids,
    wherein a light stable hop product comprising the hop solids residues is formed.

2. The method of claim 1 further comprising:
    concentrating the hop solids residues such that the light stable hop product comprises the concentrated hop solids residues.

3. The method of claim 2 wherein:
    the concentrating step comprises evaporation.

4. The method of claim 1 further comprising:
    mixing the hop solids residues with a hop oil fraction such that the light stable hop product comprises the hop solids residues and the hop oil fraction.

5. The method of claim 1 further comprising:
    mixing the hop solids residues with a beta-acid rich fraction such that the light stable hop product comprises the hop solids residues and the beta-acid rich fraction.

6. The method of claim 1 further comprising:
    mixing the hop solids residues with a light stable bittering agent such that the light stable hop product comprises the hop solids residues and the light stable bittering agent.

7. The method of claim 1 wherein:
    the first alcohol solvent and the second alcohol solvent are selected from the group consisting of ethanol and aqueous ethanol solutions.

8. The method of claim 1 wherein:
    the first alcohol solvent and the second alcohol solvent are selected from aqueous ethanol solutions having an ethanol concentration of 5% to 95%.

9. The method of claim 1 wherein:
    the first alcohol solvent and the second alcohol solvent are selected from aqueous ethanol solutions having an ethanol concentration of greater than 90%.

10. The method of claim 1 wherein:
    the first alcohol solvent and the second alcohol solvent are selected from aqueous ethanol solutions having an ethanol concentration of 95% or greater.

11. The method of claim 1 further comprising:
    contacting at least one of the first filtrate and the second filtrate with an ion exchange resin to remove alpha/iso-alpha-acids;
    collecting an effluent after contacting at least one of the first filtrate and the second filtrate with the ion exchange resin; and
    mixing the hop solids residues with the effluent such that the light stable hop product comprises the hop solids residues and the effluent.

12. The method of claim 11 further comprising:
    concentrating the hop solids residues and the effluent after mixing such that the light stable hop product comprises a concentrated mixture of the hop solids residues and the effluent.

13. The method of claim 11 further comprising:
    mixing the hop solids residues with an additive selected from the group consisting of hop oil fractions, beta-acid rich fractions, light stable bittering agents and mixtures thereof such that the light stable hop product comprises the hop solids residues, the effluent, and the additive.

14. The method of claim 11 wherein:
    the ion exchange resin is in chloride, hydroxide, or acetate ion form.

15. The method of claim 1 further comprising:
    contacting at least one of the first filtrate and the second filtrate with hydrogen in the presence of a catalyst to form a hydrogen-treated filtrate; and
    mixing the hop solids residues with the hydrogen-treated filtrate such that the light stable hop product comprises the hop solids residues and the hydrogen-treated filtrate.

16. The method of claim 15 further comprising:
    concentrating the hop solids residues and the hydrogen-treated filtrate after mixing such that the light stable hop product comprises a concentrated mixture of the hop solids residues and the hydrogen-treated filtrate.

17. The method of claim 15 further comprising:
    mixing the hop solids residues with an additive selected from the group consisting of hop oil fractions, beta-acid rich fractions, light stable bittering agents and mixtures thereof such that the light stable hop product comprises the hop solids residues, the hydrogen-treated filtrate, and the additive.

18. The method of claim 15 wherein:
    the catalyst comprises palladium or platinum.

19. The method of claim 15 wherein:
    at least one of the first filtrate and the second filtrate are contacted with hydrogen at a pressure in the range of 5-100 psig.

20. The method of claim 1 further including
    adding the light stable hop product to a wort; and
    fermenting the wort to form a fermented malt beverage.

21. A method for the preparation of a light stable hop product, the method comprising:
    mixing hop solids with a first alcohol solvent to form a mixture of the hop solids and the first alcohol solvent, wherein the hop solids are solid residue obtained by extracting whole hops or hop pellets with carbon dioxide;

separating the mixture of the hop solids and the first alcohol solvent into treated hop solids and a first filtrate including alpha/iso-alpha acids;

mixing the treated hop solids with a second alcohol solvent to form a mixture of the treated hop solids and the second alcohol solvent;

separating the mixture of the treated hop solids and the second alcohol solvent into hop solids residues and a second filtrate including alpha/iso-alpha acids, wherein a light stable hop product comprising the hop solids residues is formed, mixing at least one of the first filtrate and the second filtrate with a metal ion that complexes with alpha/iso-alpha acids to form a mixture including metal ion-alpha/iso-alpha acids complexes;

separating the metal ion-alpha/iso-alpha acids complexes from the mixture including metal ion-alpha/iso-alpha acids complexes to form a third filtrate; and mixing the hop solids residues with the third filtrate such that the light stable hop product comprises the hop solids residues and the third filtrate.

22. The method of claim 21 wherein:

the step of mixing at least one of the first filtrate and the second filtrate with the metal ion comprises mixing at least one of the first filtrate and the second filtrate with a compound selected from the group consisting of calcium carbonate, calcium hydroxide, magnesium hydroxide, magnesium carbonate, magnesium acetate, zinc sulfate, and zinc acetate, such that metal ion-alpha/iso-alpha acids complexes precipitate out of at least one of the first filtrate and the second filtrate.

23. The method of claim 21 further comprising:

concentrating the hop solids residues and the third filtrate after mixing such that the light stable hop product comprises a concentrated mixture of the hop solids residues and the third filtrate.

24. The method of claim 21 further comprising:

mixing the hop solids residues with an additive selected from the group consisting of hop oil fractions, beta-acid rich fractions, light stable bittering agents and mixtures thereof such that the light stable hop product comprises the hop solids residues, the third filtrate, and the additive.

* * * * *